United States Patent
Potlabathini et al.

(10) Patent No.: US 10,632,838 B2
(45) Date of Patent: Apr. 28, 2020

(54) LEVELING NIPPLE FOR TANK CAPABLE OF PREVENTING SPIT-BACK

(71) Applicants: Hyundai Motor Company, Seoul (KR); Kia Motors Corporation, Seoul (KR)

(72) Inventors: Sreekanth Potlabathini, Hyderabad (IN); Chun Kyu Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 201 days.

(21) Appl. No.: 15/849,360

(22) Filed: Dec. 20, 2017

(65) Prior Publication Data

US 2019/0126743 A1 May 2, 2019

(30) Foreign Application Priority Data

Oct. 31, 2017 (IN) .............................. 201711038721

(51) Int. Cl.
| | |
|---|---|
| *B60K 15/035* | (2006.01) |
| *B60K 15/06* | (2006.01) |
| *F01N 3/20* | (2006.01) |
| *B65B 1/04* | (2006.01) |
| *F16L 1/10* | (2006.01) |
| *B60K 13/04* | (2006.01) |

(52) U.S. Cl.
CPC ............ *B60K 15/035* (2013.01); *B60K 13/04* (2013.01); *B60K 15/061* (2013.01); *B65B 1/04* (2013.01); *F01N 3/2066* (2013.01); *F16L 1/10* (2013.01); *B60K 2015/03538* (2013.01); *B60K 2015/03576* (2013.01); *F01N 2610/02* (2013.01); *F01N 2610/142* (2013.01); *F01N 2610/1406* (2013.01); *F01N 2610/1413* (2013.01); *F01N 2610/1433* (2013.01); *F01N 2610/1466* (2013.01); *F01N 2610/1473* (2013.01); *Y10T 137/86348* (2015.04)

(58) Field of Classification Search
CPC .. Y10T 137/86348; B60K 2015/03538; B60K 2015/03576; B60K 15/035; B60K 13/04; F01N 2610/1413; F01N 2610/1466; F01N 2610/14; F01N 2610/1473
See application file for complete search history.

(56) References Cited

U.S. PATENT DOCUMENTS

| | | | | |
|---|---|---|---|---|
| 6,405,747 B1* | 6/2002 | King | ................ | B60K 15/03519 137/202 |
| 2013/0269532 A1* | 10/2013 | Kimoto | .............. | B01D 53/0446 96/108 |
| 2015/0167529 A1* | 6/2015 | Lee | .................. | B60K 15/03519 60/295 |

(Continued)

*Primary Examiner* — Atif H Chaudry
(74) *Attorney, Agent, or Firm* — Morgan, Lewis & Bockius LLP

(57) ABSTRACT

A leveling nipple for a tank may include a first pipe that includes a curved portion discharging air inside the tank to an outlet pipe when a fluid is supplied to the tank; and a second pipe that discharges air inside the tank to the outlet pipe when the fluid is supplied to the tank and is connected to the curved portion of the first pipe, wherein the second pipe includes a diversion portion that guides the fluid flowing into the second pipe to the first pipe.

7 Claims, 10 Drawing Sheets

(56) References Cited

U.S. PATENT DOCUMENTS

2015/0210528 A1* 7/2015 Marsala ................. B67D 7/048
                                                    141/5
2016/0250919 A1* 9/2016 Bae ................. B60K 15/03519
                                                    137/202
2016/0361993 A1* 12/2016 Kito ................. B60K 15/03519

* cited by examiner

LEVELING NIPPLE FOR TANK CAPABLE OF PREVENTING SPIT-BACK

CROSS-REFERENCE(S) TO RELATED APPLICATIONS

The present application claims priority to Indian Patent Application No. 201711038721 filed in the Indian Patent Office on Oct. 31, 2017, the entire contents of which is incorporated herein for all purposes by this reference.

BACKGROUND OF THE INVENTION

Field of the Invention

The present invention relates to a tank (e.g., a urea tank of a vehicle) capable of storing a fluid, and more particularly, to a leveling nipple for a tank capable of preventing spit-back.

Description of Related Art

In the case of a vehicle having an internal combustion engine that uses a fossil fuel including gasoline or diesel, there is a problem in that environmental pollution caused by exhaust gas is severe. In the case of diesel vehicles including buses and trucks, emission of exhaust fumes, nitrogen oxides, and fine particulates included in the exhaust fumes are considered to be a serious problem. To solve the problem caused by exhaust gas of the diesel vehicles, emission of exhaust gas is strictly regulated.

In general, exhaust systems of diesel engines are provided with exhaust gas post-treatment devices including a diesel oxidation catalyst (DOC), a diesel particulate filter (DPF), selective catalytic reduction (SCR), and a lean $NO_x$ trap (LNT) to reduce pollutants including carbon monoxide, hydrocarbons, particulate matter, and nitrogen oxides that are included in the exhaust gas.

Among the aforementioned exhaust gas after-treatment devices, an exhaust gas after-treatment device using SCR (hereinafter referred to as an "SCR device") serves to inject a reducing agent including urea into an exhaust pipe to reduce nitrogen oxides in the exhaust gas into nitrogen and oxygen.

That is, when the SCR device injects a reducing agent into the exhaust pipe, the reducing agent is converted into ammonia by the heat of the exhaust gas, and nitrogen oxides may be reduced into nitrogen gas and water by a catalyst reaction between the nitrogen oxides and ammonia in the exhaust gas, which is caused by an SCR catalyst.

To inject the urea into the exhaust pipe, a urea supply system is required to supply the urea to the SCR device. The urea supply system includes a urea tank for storing the urea (or a urea-water mixture), and a pump configured for feeding the urea stored in the urea tank to the SCR device.

The urea tank is provided with a urea injection device for injecting the urea into the tank, and the urea injection device is provided with a urea filler neck and a leveling pipe that connects the urea tank and the urea filler neck.

In the urea injection device, when the urea is injected into the urea tank through the urea filler neck, ammonia gas in the urea tank may be discharged to an injection port of the urea filler neck through a leveling pipe.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a leveling nipple for a tank (e.g., a urea tank of a vehicle) configured for preventing spit-back of a fluid including urea.

Various aspects of the present invention are directed to providing the leveling nipple for the tank, including: a first pipe that includes a curved portion discharging air inside the tank to an outlet pipe when a fluid is supplied to the tank; and a second pipe that discharges air inside the tank to the outlet pipe when the fluid is supplied to the tank and is connected to the curved portion of the first pipe. The second pipe may include a diversion portion that guides the fluid flowing into the second pipe to the first pipe.

The first pipe may further include a nozzle connected to an end portion of the curved portion. The nozzle may include a contraction nozzle.

An opening configured for reducing pressure inside the tank may be formed at a lower portion of the second pipe.

A length of the first pipe may be greater than a length of the second pipe.

The tank may include a urea tank of a vehicle. The first pipe and the second pipe may be formed adjacent to each other.

The leveling nipple for the tank according to the exemplary embodiment of the present invention may reduce a pressure inside the tank while the tank is filled with the fluid. Thus, the exemplary embodiment of the present invention may prevent spit-back of the fluid.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
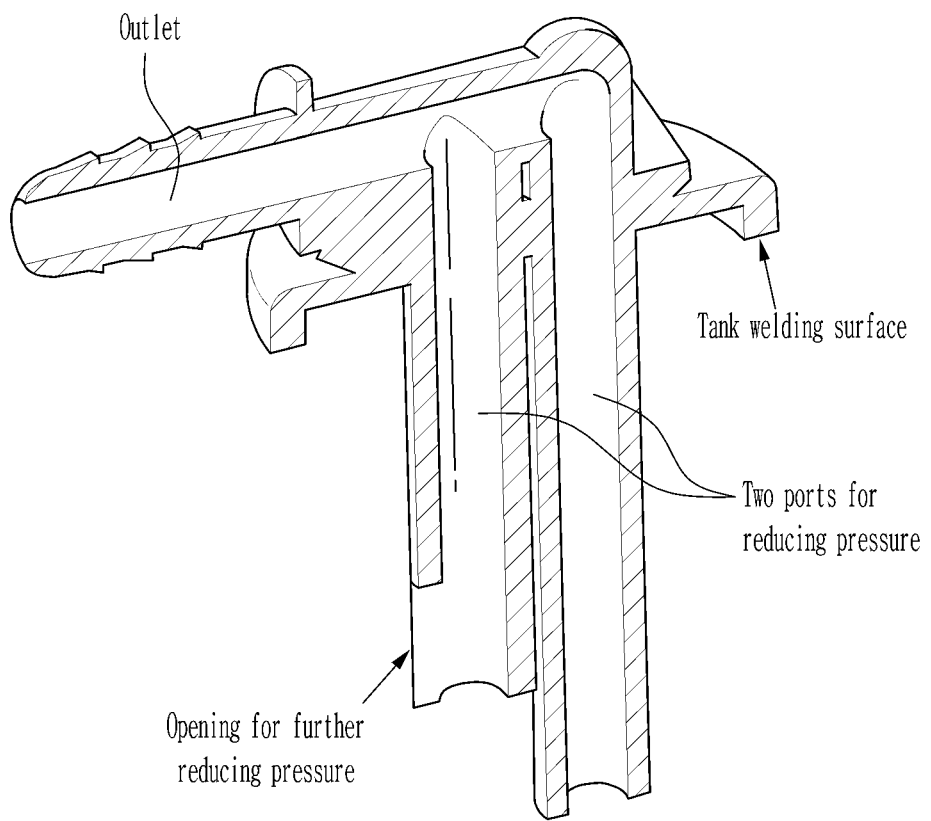
FIG. 1 is a cross-sectional view for explaining an example of a leveling nipple of a urea tank according to the prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms used in the present specification are only used to describe specific exemplary embodiments rather than limiting the present invention. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electronically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

While urea is being filled in a urea tank at a high flow rate and at a high pressure, pressure inside the urea tank increases. Thus, a spit-back phenomenon of the urea may occur through a leveling nipple of the urea tank. The spit-back phenomenon may refer to a phenomenon in which the urea is discharged to the outside of a urea injection port connected to the urea tank.

FIG. 1 is a cross-sectional view for explaining an example of a leveling nipple of the urea tank.

Referring to FIG. 1, the leveling nipple of the urea tank includes an outlet, a welding portion for fixing the leveling nipple to the urea tank, and two ports which are connected to the outlet configured to reduce pressure in the urea tank generated when the urea is supplied to the urea tank. One of the ports has an opening to further reduce the pressure inside the urea tank.

FIG. 2 through FIG. 5 are cross-sectional views for explaining a function of the leveling nipple shown in FIG. 1.

Figure 2:
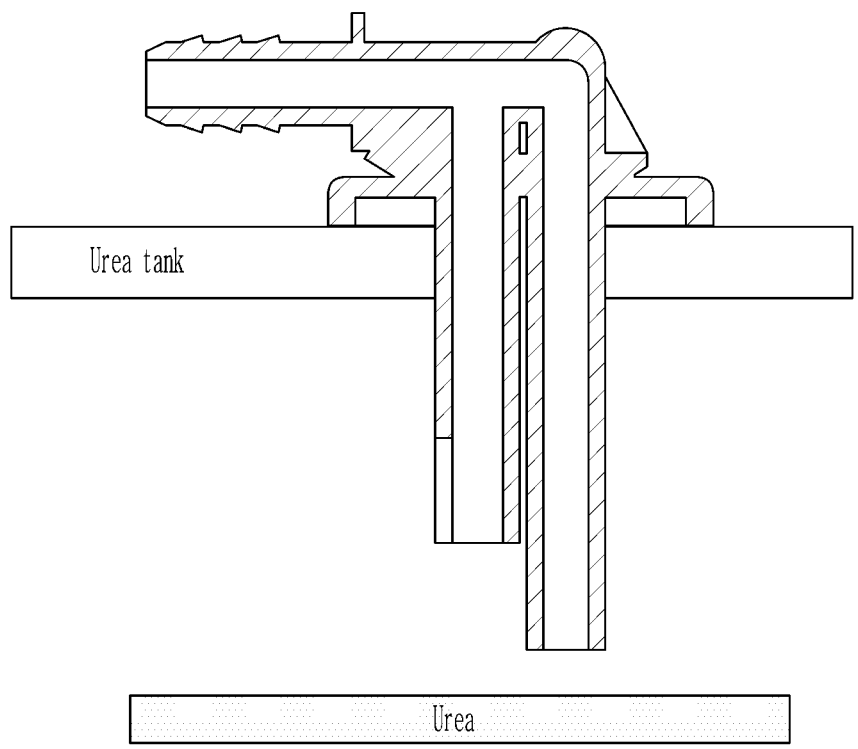
FIG. 2, FIG. 3, FIG. 4, and FIG. 5 are views for explaining a function of the leveling nipple shown in FIG. 1.

Referring to FIG. 2, air in the urea tank exits through the ports of the leveling nipple when the urea is injected through a urea injection pipe of the urea tank to increase a level of the urea of the urea tank.

Figure 3:
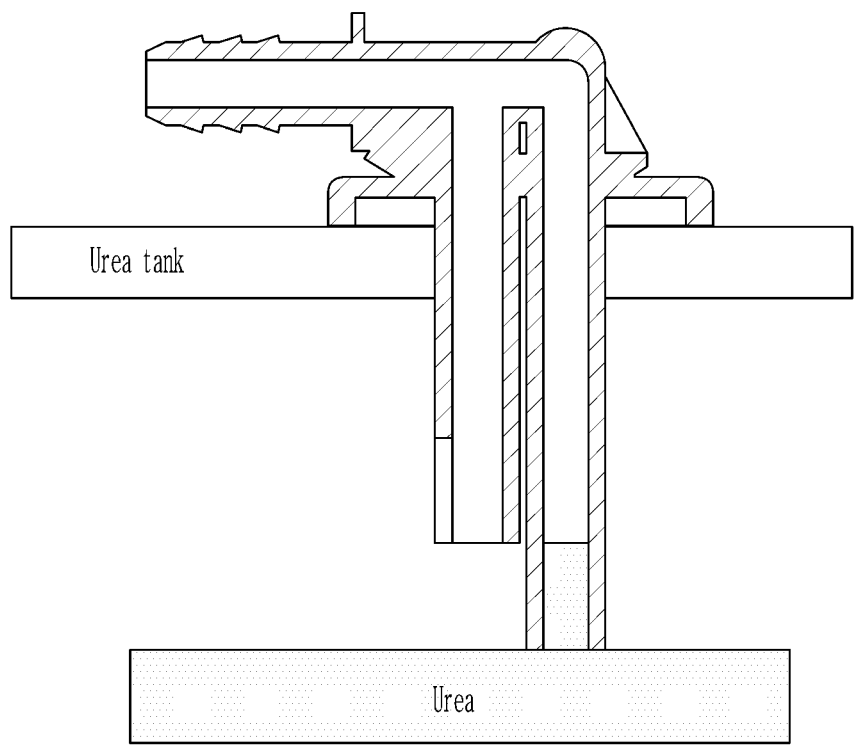

Referring to FIG. 3, when the level of the urea is increased so that the urea is introduced into a first of the ports, air escapes through a second of the ports.

Figure 4:
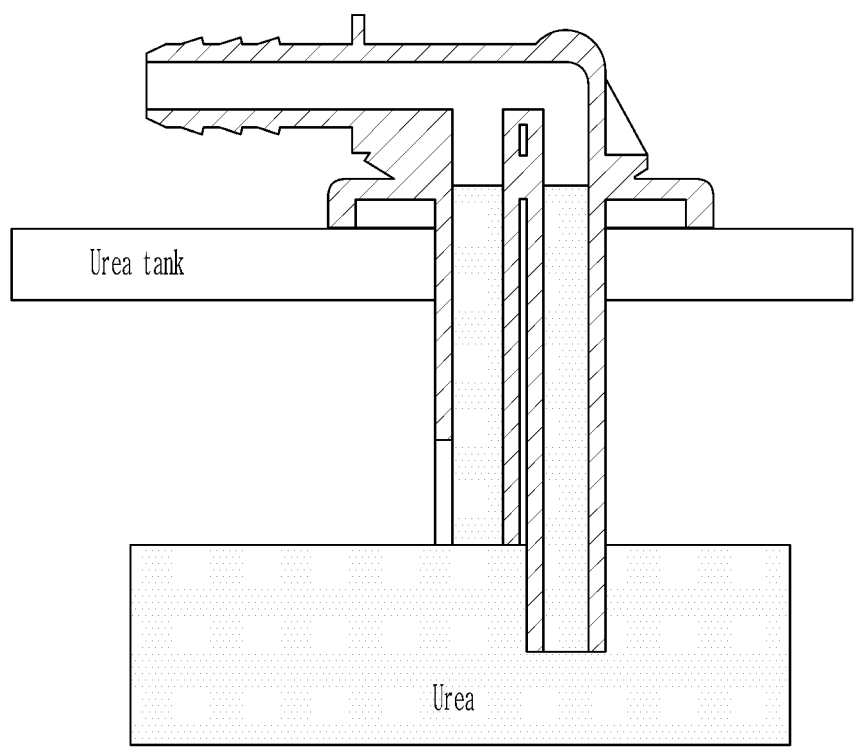

Referring to FIG. 4, when the level of the urea is further increased, the urea flows into the second port.

Figure 5:
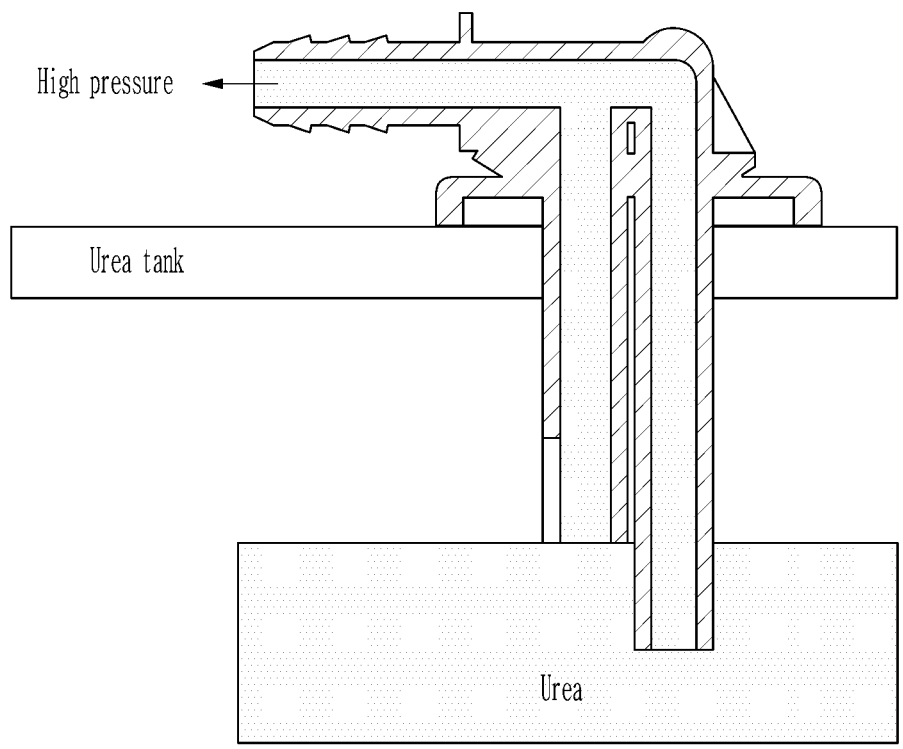

Referring to FIG. 5, when the level of the urea is further increased, the urea flows into the first port and the second port wherein a pressure of the outlet becomes a high pressure and the urea flows out through the outlet. The spilled urea may move to the urea injection port. In other words, the spit-back phenomenon occurs at the outlet.

Figure 6:
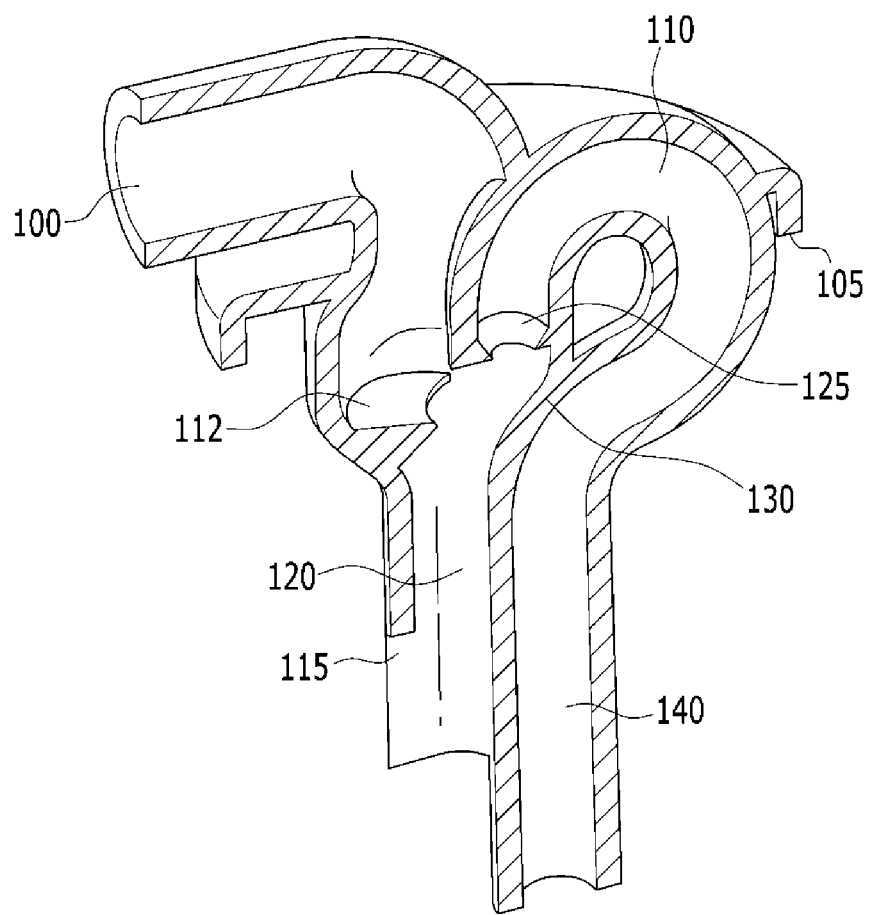
FIG. 6 is a cross-sectional view illustrating a leveling nipple for a tank configured for preventing spit-back according to an exemplary embodiment of the present invention.

FIG. 6 is a cross-sectional view illustrating a leveling nipple for a tank configured for preventing spit-back according to an exemplary embodiment of the present invention.

Referring to FIG. 6, the leveling nipple for the tank including a urea tank of a vehicle includes an outlet pipe 100 connected to a leveling pipe, a welding portion 105 fixing the leveling nipple to the urea tank, a first pipe 140, and a second pipe 120. The leveling nipple may be configured to control an amount of an injected fluid or to reduce a pressure inside the tank (or a pressure of the fluid) when the fluid (e.g., urea) is injected into the tank.

The first pipe 140 may include a curved portion 110 for discharging air or ammonia gas in the tank to the outlet pipe 100 when the fluid is supplied to the tank, and a nozzle 125 connected to an end portion of the curved portion 110.

The fluid flowing from the curved portion 110 into the nozzle 125 may have high backpressure. A wall surface 130 of the curved portion 110 may reduce turbulence of the fluid or backpressure of the fluid.

The second pipe 120 may discharge air or ammonia gas in the tank to the outlet pipe 100 when the fluid is supplied to the tank, and may be connected to the curved portion 110. The second pipe 120 may include a diversion portion 112 for guiding the fluid introduced into the second pipe 120 to the first pipe 140.

The nozzle 125 may increase a flow velocity of the fluid. For example, the nozzle 125 may include a contraction nozzle.

An opening 115 for further reducing pressure inside the urea tank may be formed at a lower portion of the second pipe 120.

A length of the first pipe 140 may be greater than a length of the second pipe 120. Therefore, when a level of the urea of the urea tank is increased, the urea may first flow into the first pipe 140 rather than into the second pipe 120.

The first pipe 140, the second pipe 120, and the outlet pipe 100 may be formed adjacent to each other.

The outlet pipe 100 may be connected to the second pipe 120 via the diversion portion 112.

FIG. 7, FIG. 8, FIG. 9, and FIG. 10 are cross-sectional views illustrating a function (a working or operating state) of the leveling nipple shown in FIG. 6.

Figure 7:
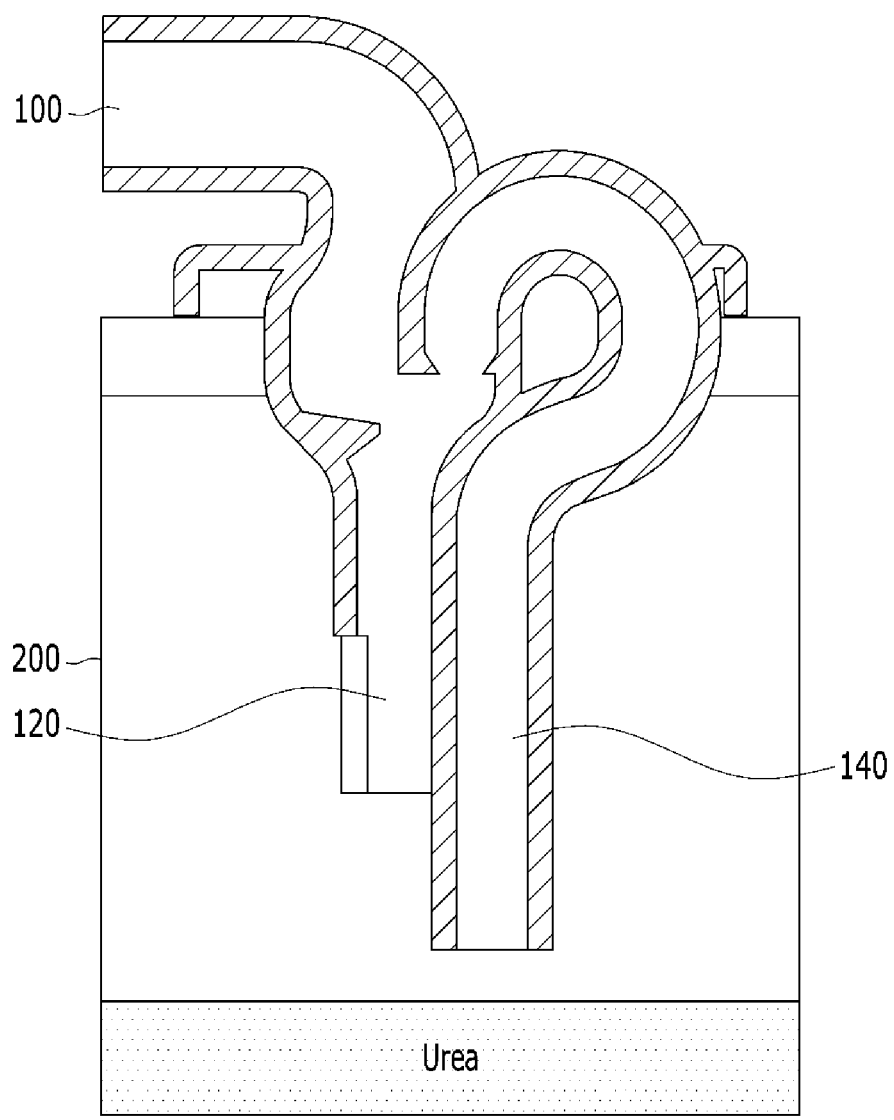
FIG. 7, FIG. 8, FIG. 9, and FIG. 10 are views illustrating a function of the leveling nipple shown in FIG. 6.

Referring to FIG. 7, when the urea is injected through a urea injection pipe of a urea tank 200 to increase the level of the urea of the urea tank, air in the urea tank may escape through the first pipe 140 and the second pipe 120.

The urea injection pipe may be disposed at an upper side of the urea tank 200, and may be connected to a urea injection port connected to the leveling pipe.

Figure 8:
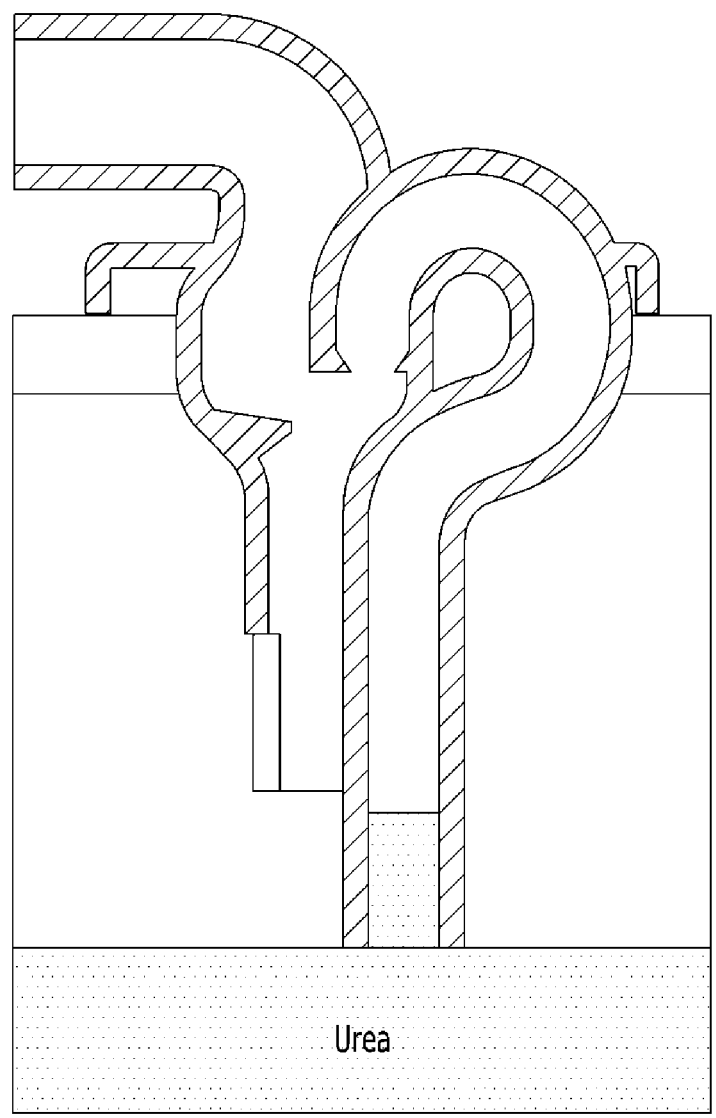

Referring to FIG. 8, when the level of the urea is increased so that the urea is introduced into the first pipe 140, air may escape through the second pipe 120.

Figure 9:
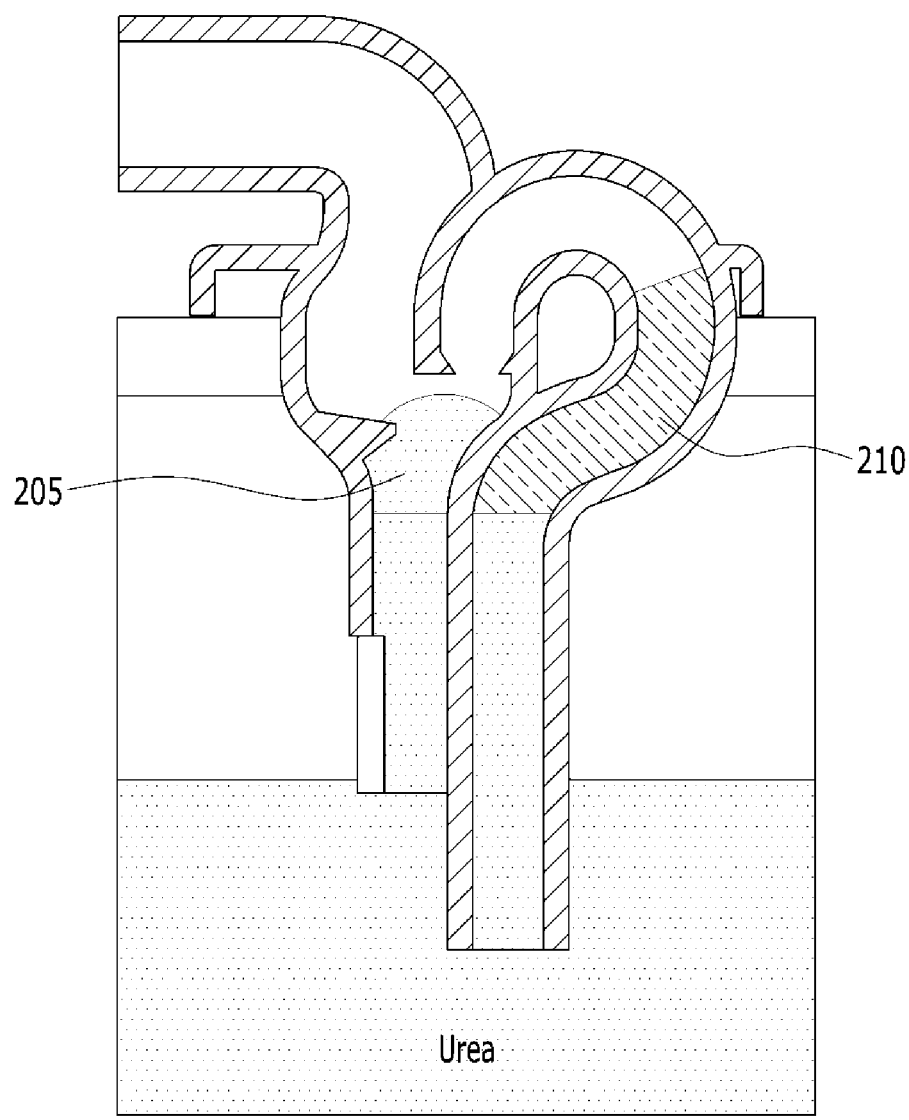

Referring to FIG. 9, the urea may be introduced into the second pipe 120 when the level of the urea is further increased. The second pipe 120 may have a smaller orifice outlet than an orifice outlet of the first pipe 140. Thus, when the level of the urea is further increased after the urea is introduced into the second pipe 120, an amount of the urea passing through the second pipe 120 may be restricted to an amount shown by reference numeral 205, but an amount of the urea passing through the first pipe 140 may be a relatively greater amount shown by reference numeral 210.

Figure 10:
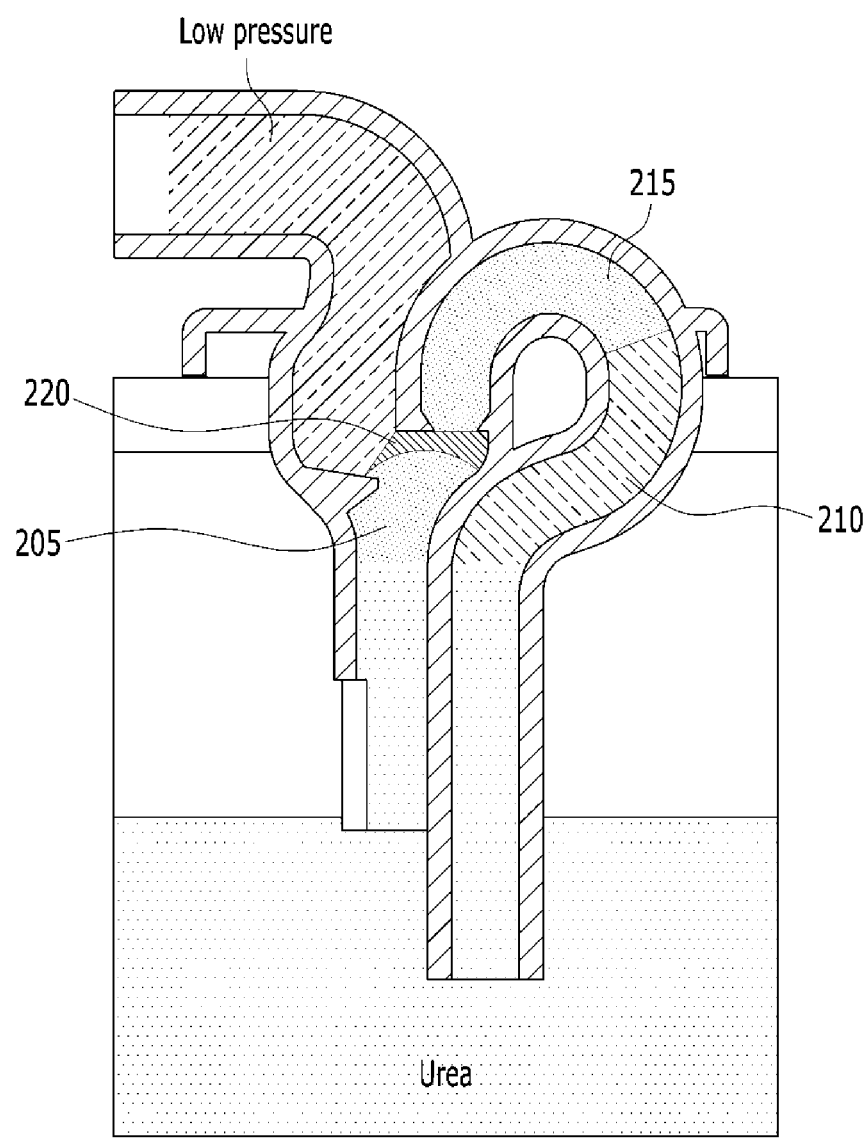

Referring to FIG. 10, when the level of the urea is further increased, an amount of the urea flowing into the first pipe 140 is an amount shown by reference numeral 215, and an amount of the urea passing through the second pipe 120 may be an amount shown by reference numeral 220. Therefore, the urea passing through the curved portion 110 of the first pipe 140 may have high backpressure and may force the urea passing through the second pipe 120 using the high backpressure, and thus the spit-back of the urea through the outlet pipe 100 may be prevented.

A pressure in the outlet pipe 100 may be low when the urea passing through the first pipe 140 contacts the urea passing through the second pipe 120.

As described above, a pressure generated when the fluid flows through the leveling nipple according to the exemplary embodiment of the present invention may be used to force a flow of the fluid into the tank. Therefore, the exemplary embodiment of the present invention may prevent the spit-back of the fluid by forming a pressure in the tank, and may prevent cut-off (or shut-off) of a filler gun (or an injection gun) that supplies the urea through the urea injection port of the urea tank 200.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claimed appended hereto and their equivalents.

What is claimed is:

1. A leveling nipple for a tank, the leveling nipple comprising:
    a first pipe that includes a curved portion discharging air inside the tank to an outlet pipe when a fluid is supplied to the tank; and
    a second pipe that discharges air inside the tank to the outlet pipe when the fluid is supplied to the tank and is directly connected to the curved portion of the first pipe,
    wherein the second pipe includes a diversion portion that guides the fluid flowing into the second pipe to the first pipe,
    wherein the first pipe further includes a nozzle connected to an end portion of the curved portion, and
    wherein the nozzle includes a contraction nozzle.

2. The leveling nipple of claim 1, wherein an opening reducing pressure inside the tank is formed at a lower portion of the second pipe.

3. The leveling nipple of claim 1, wherein a length of the first pipe is greater than a length of the second pipe.

4. The leveling nipple of claim 1, wherein the tank includes a urea tank of a vehicle.

5. The leveling nipple of claim 1, wherein the first pipe and the second pipe are formed adjacent to each other.

6. The leveling nipple of claim 1, wherein the second pipe has orifice smaller than an outlet orifice of the first pipe.

7. The leveling nipple of claim 1, wherein the curved portion includes a wall surface to reduce turbulence of a fluid flow.

* * * * *